UNITED STATES PATENT OFFICE.

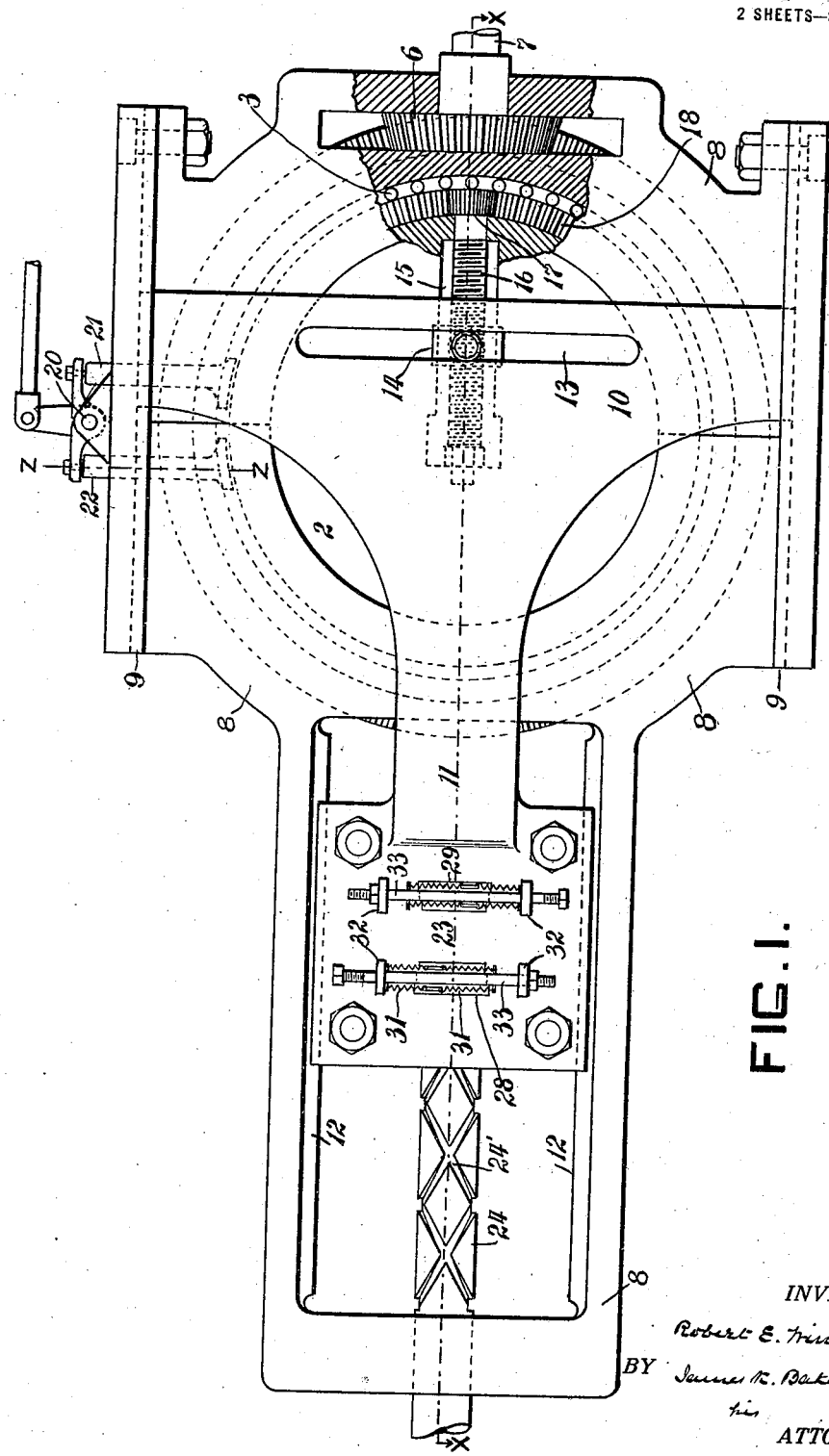

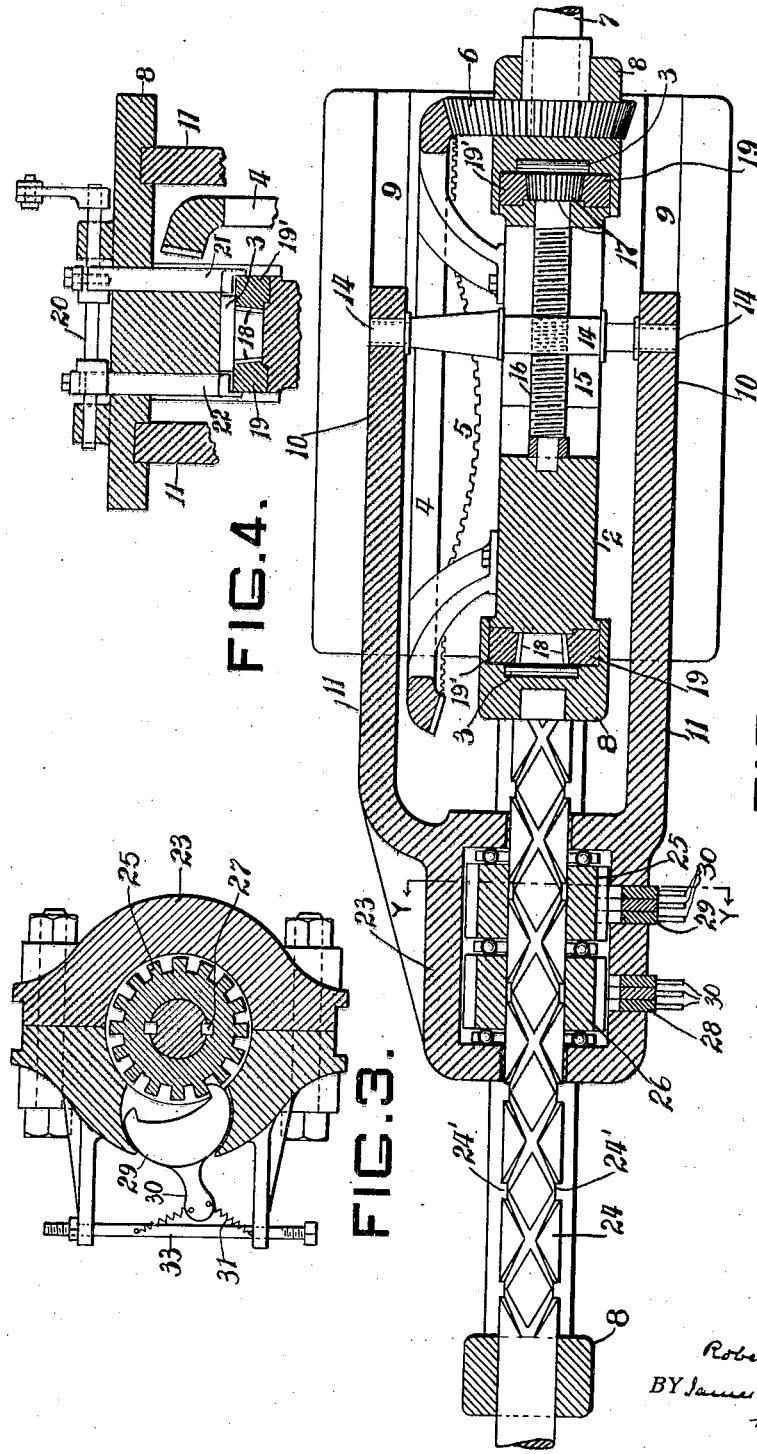

ROBERT E. WINTERS, OF CORAOPOLIS, PENNSYLVANIA, ASSIGNOR OF ONE-HALF TO ANTHONY E. DEAN, OF PITTSBURGH, PENNSYLVANIA.

SPEED-CHANGE MECHANISM.

1,352,716.  Specification of Letters Patent.  Patented Sept. 14, 1920.

Application filed June 5, 1918. Serial No. 238,277.

*To all whom it may concern:*

Be it known that I, ROBERT E. WINTERS, of Coraopolis, in the county of Allegheny and State of Pennsylvania, have invented a new and useful Improvement in Speed-Change Mechanism, of which the following is a full, clear, and exact description, reference being had to the accompanying drawings, forming part of this specification, in which—

Figure 1 is a side elevation partly broken away; Fig. 2 is a longitudinal sectional view on the line x—x of Fig. 1; Fig. 3 is a cross sectional view on the line y—y of Fig. 2; and Fig. 4 is a detached sectional view on the line z—z of Fig. 1.

My invention relates to speed changing mechanism and it has for its object a speed changing mechanism for automobiles and the like, in which a progressively graduated change may be made, without the use of the gear trains commonly in use, in such manner that the change of speed may be made smoothly and to any desired extent.

In the drawings, 2 represents a regulating wheel which is mounted on roller bearings 3 in a circular track in the frame 8 of the mechanism. To this wheel is attached a circular bracket 4 on the inner face of which is an undulating or cam shaped rack 5 which meshes with a pinion 6 which is eccentrically keyed to the engine driven shaft 7, whereby an irregular movement of rotation is imparted to the wheel 2 at right angles to the movement of rotation of the engine driven shaft 7, the purpose being to increase the speed at desired intervals in the rotation of the rack to make accommodation for the loss of speed at the end of the stroke of the piston.

At the sides of the frame 8 of the mechanism are slide ways 9 in which is fitted the reciprocating heads 10 from which extend the piston arms 11, which are attached to or form part of the casing 23 containing the reversing mechanism, the casing 23 fitting in slide ways 12 formed in the frame 8. Formed in the heads 10 are vertical slots 13 in which are slidably journaled the ends of the transverse pin 14 which passes through the radial slot 15 in the wheel 2. Journaled radially in the wheel 2 and within the slot 15 is the worm shaft 16 which meshes with a rack on the pin 14, and fixed to the outer end of the shaft 16 is a pinion 17 which meshes with circular racks 18 on the faces of rings 19, 19′, which fit slidably in recesses in the periphery of the wheel 2, and travel on the roller bearings 3.

Pivoted to the frame 8 is a rock lever 20, having inwardly extending pressure arms 21, 22, which bear on the peripheries of the rings 19, 19′, to serve as friction stop brakes to cause either ring to cease its rotation with the wheel 2, whereby the pinion 17 and the worm shaft 16 may be driven in either direction, the stationary ring acting as a rack on the pinion as it moves with the wheel 2. This rotation of the worm of the shaft 16 moves the rack pin 14 in the slot 13 of the heads 10 either away from or toward the center of the slots, whereby the pin, from the rotation of the wheel 2, imparts a greater or less movement to the pistons 11 to increase or decrease the speed of the mechanism.

Journaled in the frame 8 is the power shaft 24 which is provided with right and left hand helical grooves or slots 24′. This shaft is encircled by two collars or pinions 25 and 26, which are provided with blunt teeth on their peripheries which serve as ratchets, and they are supported by ball bearings within the casing 23. On the inner circumferences of these collars are lugs 27 which fit in the grooves 24′ of the shaft 24, the lug of one collar fitting in the right hand groove and the lug of the other collar in the left hand groove. Seated in suitable cavities in the casing 23 are the two series of rocking pawls 28 and 29, the outer faces of the teeth of which are curved to slip on the ratchet, and the inner faces angular to engage therewith. Extending from these pawls are arms 30 which are connected by springs 31 with the arm 32 extending from the casing 23 and with movable pins 33, by the movement of which pins either of the two teeth of the pawls may be caused to engage with the ratchet. Normally one series of pawls is adjusted to engage with the ratchet on one collar during the forward movement of the casing 23 to hold the collar and thereby impart rotation to the shaft 24 through the lug 27 traveling in one of the grooves 24′, and the other series of pawls is adjusted to slip over the ratchet of the other collar permitting it to ride loosely on the shaft. On the return movement of the casing 23 the collars 25 and 26 travel in the opposite direction and the other of the series of pawls becomes active on the collar engaging with the other of the grooves of the shaft 24, thus causing a continued rotation of the shaft in one direction. By moving the pin 33, the position of the series of pawls is reversed causing a reversal of the shaft 24. The purpose of having the pawls 28 and 29 in series of two or more is to insure engagement with the ratchets.

The operation of the mechanism is as follows: When it is desired to increase the speed, pressure is applied to one of the rings 19, 19', by means of the brake 22, which serves to prevent the rotation of the ring with the wheel 2, and causes the rack on the ring to rotate the pinion 17, and the worm 16 to move the pin 14 in the slot 13 of the reciprocating head 10 farther from the center of the slot, thus giving a longer stroke to the piston 11, casing 23, and lugs 27 in the grooves 24', thereby increasing the speed of rotation of the shaft 24. When the speed is to be reduced the brake 22' is applied to the other of the rings 19' and the pin 14 is retracted toward the center of the slot 13. To reverse the rotation of the shaft 24, the pin 33 is so moved as to reverse the action of the pawls 28 and 29 in the manner already described. To stop the drive of the mechanism without stopping the engine, the pin 14 is brought to the center of the slot 13 which allows the wheel 2 to rotate without imparting movement to the piston 11, casing 23, and shaft 24, which serves as a brake or stop to the moving automobile or other machine according to the degree of movement given to the pin 14.

The advantages of my invention will be appreciated from the foregoing description by those skilled in the art.

What I claim and desire to secure by Letters Patent is:—

1. In speed change mechanism the combination of a drive wheel, an adjustable pitman, a positively actuated driving shaft, an eccentric connection between the driving shaft and the drive wheel, a power shaft having reverse grooves, collars carried by the pitman and engaging with the grooves, and double-acting pawls arranged to alternately engage with and slip on the collars.

2. In speed change mechanism the combination of a drive wheel, an adjustable pitman, circular racks slidably mounted on the drive wheel to rotate therewith, a shaft rotatably mounted in the driving wheel, a pinion mounted on said shaft and meshing with said racks, stop brakes adapted to stop rotation of either rack, and a pin connected with said shaft and adapted to adjust the pitman.

3. In speed change mechanism the combination of a drive wheel, an adjustable pitman, circular racks slidably mounted on the drive wheel to rotate therewith, a shaft rotatably mounted in the driving wheel, a pinion mounted on said shaft and meshing with said racks, stop brakes adapted to stop the rotation of either rack, a pin connected with the rotatable shaft and arranged to adjust the pitman, a power shaft having reverse grooves, collars carried by the pitman and engaging with said grooves, and double-acting pawls arranged to alternately engage with and slip on the collars.

4. In speed change mechanism the combination of a drive wheel, an adjustable pitman, a positively actuated driving shaft, an eccentric connection between the driving shaft and the drive wheel, a power shaft having reverse grooves, collars engaging with the grooves, double acting pawls arranged to alternately engage with and slip on the collars, and means for reversing the action of said pawls for reversing the direction of rotation of said power shaft.

5. In speed change mechanism the combination of a driving shaft, a power shaft having reverse grooves, collars engaging with said grooves, an adjustable pitman carrying said collars, and connecting devices comprising an undulating rack between said driving shaft and said pitman arranged to impart even reciprocatory motion to said pitman.

In testimony whereof, I have hereunto set my hand.

ROBERT E. WINTERS.

Witnesses:
 A. E. DEAN,
 L. J. BROWN.